(12) United States Patent
Chandrasekar et al.

(10) Patent No.: US 7,136,845 B2
(45) Date of Patent: Nov. 14, 2006

(54) SYSTEM AND METHOD FOR QUERY REFINEMENT TO ENABLE IMPROVED SEARCHING BASED ON IDENTIFYING AND UTILIZING POPULAR CONCEPTS RELATED TO USERS' QUERIES

(75) Inventors: Raman Chandrasekar, Redmond, WA (US); James C. Finger, II, Kirkland, WA (US); Eric B. Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 09/682,040

(22) Filed: Jul. 12, 2001

(65) Prior Publication Data
US 2003/0014403 A1    Jan. 16, 2003

(51) Int. Cl.
*G06F 17/30* (2006.01)
(52) U.S. Cl. .................... 707/3; 707/102; 707/101; 707/104.1
(58) Field of Classification Search ............... 707/1–3, 707/6, 104.1, 102, 100; 704/10
See application file for complete search history.

(56) References Cited

U.S. PATENT DOCUMENTS

| | | | | |
|---|---|---|---|---|
| 5,675,819 | A * | 10/1997 | Schuetze ..................... | 704/10 |
| 5,721,897 | A * | 2/1998 | Rubinstein ................... | 707/2 |
| 5,724,571 | A * | 3/1998 | Woods ......................... | 707/5 |
| 6,006,225 | A * | 12/1999 | Bowman et al. .............. | 707/5 |
| 6,263,335 | B1 * | 7/2001 | Paik et al. .................... | 707/5 |
| 6,278,992 | B1 * | 8/2001 | Curtis et al. .................. | 707/3 |
| 6,282,538 | B1 * | 8/2001 | Woods ......................... | 707/5 |
| 6,526,440 | B1 | 2/2003 | Bharat ....................... | 709/219 |
| 6,529,903 | B1 | 3/2003 | Smith et al. ................. | 707/7 |
| 6,578,022 | B1 * | 6/2003 | Foulger et al. .............. | 706/45 |
| 6,581,072 | B1 * | 6/2003 | Mathur et al. ........... | 707/104.1 |
| 6,615,209 | B1 * | 9/2003 | Gomes et al. ................ | 707/5 |
| 6,658,423 | B1 | 12/2003 | Pugh et al. ................ | 707/102 |
| 6,678,681 | B1 | 1/2004 | Brin ............................. | 707/6 |
| 2002/0123988 | A1 | 9/2002 | Dean et al. ................... | 707/3 |
| 2002/0133481 | A1 | 9/2002 | Smith et al. .................. | 707/3 |

OTHER PUBLICATIONS

Brin, S. et al., "The Anatomy of a Large-Scale Hypertextual Web Search Engine", *The Anatomy of a Search Engine*, Aug. 7, 2000, http://www7.scu.edu.au/programme/fullpapers/1921/com1921.htm, 18 pages.

* cited by examiner

*Primary Examiner*—Sana Al-Hashemi
(74) *Attorney, Agent, or Firm*—Woodcock Washburn LLP

(57) ABSTRACT

Refining a user query is disclosed. In one method, a query is received from a user, and then mapped to one or more search concepts. A list of search concepts associated with the query is then displayed. Alternatively or additionally, the search concepts associated with the query are used to provide a set of improved search results. In another method, a number of queries from a number of users are analyzed to identify two or more search concepts, and a popularity value is assigned to them based on the queries. Thus, the relative popularity of the respective search concepts can be determined. Alternatively or additionally, a preferred search query for the search concepts can be determined. The popularity and preferred queries can be used to allow automatic or user-initiated refinement.

13 Claims, 13 Drawing Sheets

| CONCEPT WORD(S) | 102 |
| --- | --- |
| KEY PHRASE(S) | 104 |
| ASSOCIATED WEB SITE(S) | 106 |

100

| | |
|---|---|
| QUERY 1 | <u>400a</u> |
| QUERY 2 | <u>400b</u> |
| ⋮ | |
| QUERY m | <u>400m</u> |

400

| | | |
|---|---|---|
| 502 → NUM | CONCEPT WORD(S) | 102 |
| 502a → NUM | KEY PHRASE 1 | 104a |
| 502b → NUM | KEY PHRASE 2 | 104b |
| | ⋮ | |
| 502n → NUM | KEY PHRASE n | 104n |

500

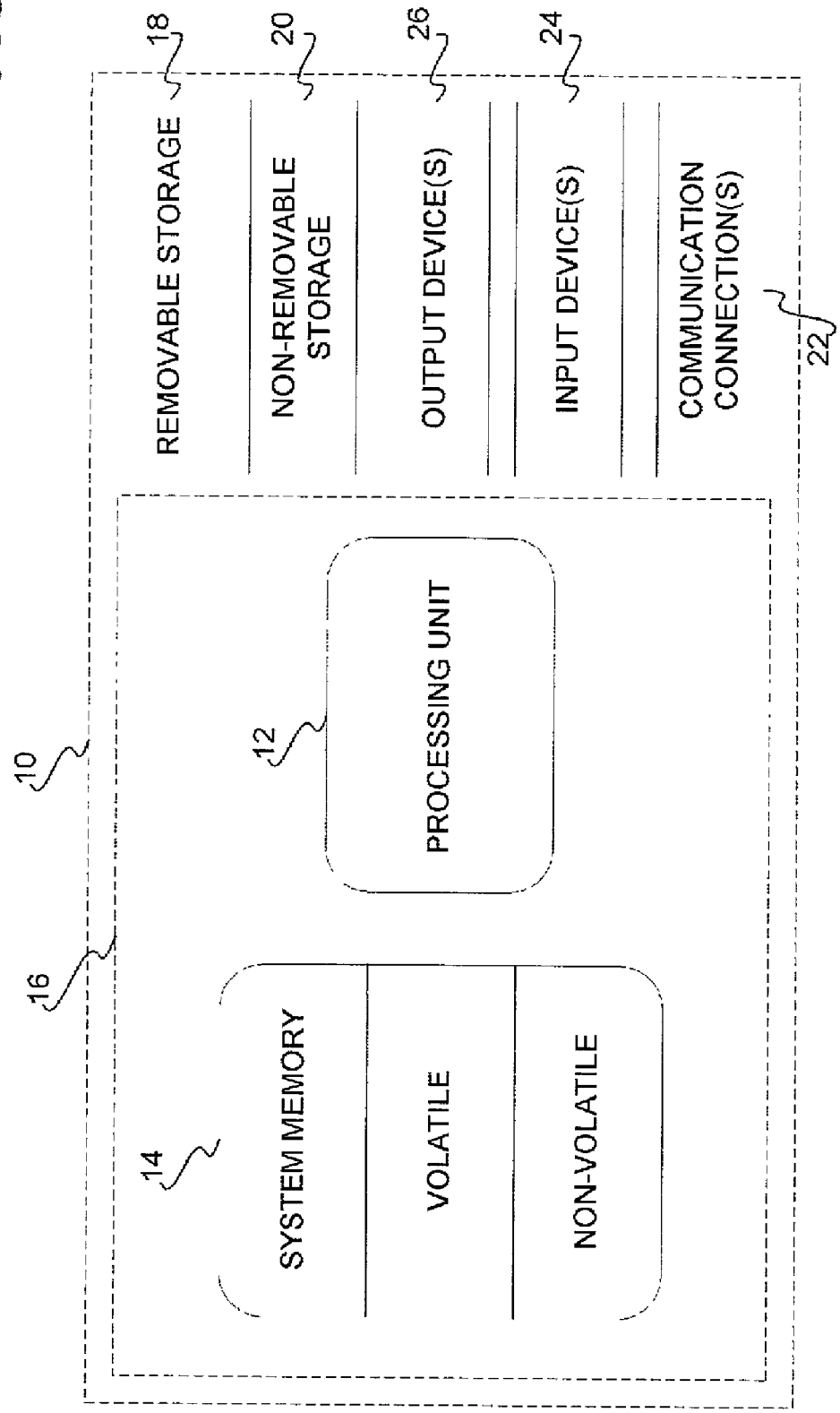

SYSTEM AND METHOD FOR QUERY REFINEMENT TO ENABLE IMPROVED SEARCHING BASED ON IDENTIFYING AND UTILIZING POPULAR CONCEPTS RELATED TO USERS' QUERIES

BACKGROUND OF THE INVENTION

The invention relates generally to searching for relevant data entities based on a search query, specifically in the context of ambiguous or under-specified queries. More particularly, the invention relates to helping users to refine their search queries by identifying search concepts related to the user's search query, providing the means for the user to use these concepts to refine their query and submit an enhanced query based on such concepts, and thus access information more specific to their needs.

One of the greatest strengths and greatest weaknesses of the Internet is the vast amount of information that is distributed over all the computers connected on the Internet. This is one of the Internet's greatest strengths in that individuals have access to great amounts of information on almost any topic imaginable. However, this is also one of the Internet's greatest weaknesses in that, because of the vast amount of information, it is difficult to know what information on a desired topic is available, and where to go to find the information.

Search engine technology attempts to overcome this weakness of the Internet by providing an indexed access to a collection of web pages that a user can search. The user typically enters a search query. The search engine then finds the web pages that contain or otherwise relate to the search query, and this list of web pages is presented to the user. There are a number of different ways that search engines determine which web pages are relevant to a given search query, such that those web pages are presented to the user.

First, one type of search engine constantly scans the Internet, in a process referred to as spidering. This type of search engine has been popularized by ALTA VISTA and GOOGLE, among others. Each page of a web site that is visited by the spider is cataloged for the words that appear in the web site. This information is indexed and stored in a search engine database. When a user enters a search query, the search engine matches the query against the search engine database to find the web pages that are most relevant to the query by some measure. For example, the search engine may determine the number of times the query appears in a given web page to determine its relevance, or the search engine may determine the number of other web pages that link to the given web page in which the query appears to determine its relevance.

This type of search engine is disadvantageous in that many search queries contain words that are related to more than what the user is searching. For example, the user may be looking for web pages regarding the golfer Tiger Woods. However, if the user just enters the word Tiger as the search query, the search engine is likely to return many web pages related to the animal tiger, as well as to the golfer Tiger Woods. Furthermore, if the user enters the words Tiger Woods, the search engine may also return web pages that include the words tiger and woods, but which do not necessarily relate to the golfer Tiger Woods.

Another type of search engine compares a search query to web pages cataloged in a topical directory. This type of search engine has been popularized by YAHOO! and LOOKSMART. A team of people assigns web sites to one or more different categories within the directory. When a user enters a search query, the search engine matches the query against the directory of web pages, and returns both the categories and the individual web pages that are relevant to the query. For example, in response to a Tiger Woods query, the search engine may return the category Sports:Golfers: Tiger Woods and the category Animals:Tigers, as well as web pages that contain both the words tiger and woods.

This type of search engine also has its disadvantages. If the user enters a query too broad to find adequately specific and targeted results, it is often difficult to guess a query that would easily and accurately narrow the query to the desired area.

Other failings are common to all of these and other types of search engines. Most are unforgiving as to misspelled words, or abbreviated variants for desired topics. For example, if the user enters in tigr woods instead of Tiger Woods, search engines are likely not to return many relevant pages regarding the golfer. Search engines may also provide results that are considered inappropriate by many users, or, in the case of children, their parents. For example, a user may enter in as a query the name of his or her favorite singer. Besides web sites geared towards providing information about the singer, search engines may also return X-rated sites that claim to provide inappropriate pictures of the singer.

Another failing of existing types of search engines is that they assume a level of searching experience or sophistication on the part of their users that may not exist. In other words, the quality of search results they return frequently corresponds to how good the search query is that the user entered. Users who are less competent in formulating search queries are therefore likely to receive poorer search results from search engines as compared to users who are more competent in formulating queries. For example, less knowledgeable users may enter queries that are overly broad, or alternatively, overly specific. Overly broad queries are likely to generate search results that contain a number of irrelevant web pages, whereas overly specific queries are likely to generate search results that may not include a number of relevant web pages.

For these and other reasons, therefore, there is a need for the present invention.

SUMMARY OF INVENTION

The invention relates generally to refining a user query. In a method of one embodiment, a query is received from a user, and then mapped to one or more search concepts. A list of search concepts associated with the query is then displayed. Alternatively or additionally, the search concepts associated with the query are used to provide a set of improved search results instead of being displayed. In a method of still another embodiment, a number of queries from a number of users are analyzed to identify two or more search concepts, and a popularity value is assigned to them based on the queries. Thus, the relative popularity of the respective search concepts can be determined. Alternatively or additionally, a preferred search query for the search concepts can be determined.

Furthermore, one specific embodiment of the invention relates to searching and query refinement based on matching user's queries to key phrases of concepts that have a popularity measured by the appearance of the concept's title and key phrases within the search engine's log of all queries. In particular, this embodiment relates to helping users to refine their search queries by identifying popular concepts related to the user's search query, providing the means for the user to use these concepts to refine their query and submit an enhanced query based on such concepts, and thus access information more specific to their needs.

For example, a concept may be Tiger Woods. The key phrases associated with this concept may include tiger, tigr, greatest golfer; tiger woods the golfer, as well as other key phrases. Another concept may be the animal tiger, with its own key phrases. Each concept may have one or more data entities (web page links, other information) considered most relevant to the concept associated with it.

To determine the popularity of each concept, the key phrases and concept words can be matched to a query log of past queries. The popularity of each concept is based on at least the number of different query phrases within the query log that match the key phrases of the concept, and the number of times each of these query phrases appears within the query log. More particularly, a number of popularity points proportional to the number of times a query phase appears in the query log is added to the concept where the query phase matches a key phrase that is unique to the concept. For a key phrase that appears in more than one concept, a number of popularity points proportional to the number of times a query phrase appears in the query log that matches the key phrase is apportioned among such concepts.

When a user enters a query, the query is matched against the key phrases and titles of the concepts to yield matching concepts. Matching concepts are those having one or more key phrases that match the query. For example, a user entering in tiger may have returned to him or her two concepts, Tiger Woods, and tiger(the animal).

A general popularity measure of each concept may also be determined and returned to the user. The popularity measure of a concept reflects its popularity within the query log as indicated by the number of popularity points that have been added for the concept. For example, in one implementation, the popularity measure can be determined as five times the log of the popularity points of the concept divided by the log of the popularity points of the most popular overall concept. This popularity measure returns a number from one to five indicating the relative popularity measure of the concept. Note that other implementations of the popularity measure may be devised and used.

A preferred search query of each concept is also determined and returned to the user. For example, the key phrase of a concept that is uniquely associated only with the concept, and that has a greatest popularity of any key phrase of the concept within the query log, may be selected as the preferred search query for that concept. The use of this preferred search query as the user's next query is aimed at obtaining the best results related to the associated concept. The popularity of a key phrase is determined by the number of popularity points added to the concept as a result of the key phrase matching a query phase within the query log. The invention is not restricted to data entities of type web links, but can be used to access data or data entities of a number of different types including documents, document links, web pages, video files etc. Although the invention described is for data entities that are web page links, this is for the purposes of example only, and does not represent a limitation of the invention in anyway.

The invention overcomes some of the disadvantages of the prior art indicated in the background. For example, overly broad search queries entered by users can be refined such that the users receive links to get relevant search results while the number of irrelevant web pages is significantly reduced. Additionally, since the concepts displayed are editorially chosen, these are free of pornography or other undesirable material, and may safely be used as steps in refinement.

The invention includes methods and computer-readable media of varying scope. Still other aspects, advantages, and embodiments of the invention, besides those described in this summary, will become apparent by reading the detailed description that follows, and by referring to the drawings.

BRIEF DESCRIPTION OF DRAWINGS

FIG. 13 is a block diagram of a representative computing system environment in accordance with which exemplary embodiments of the invention may be implemented.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Concepts, key phrases, and associated data entities

Figure 1:
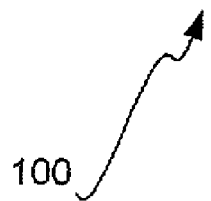
FIG. 1 is a diagram showing the structure of a concept, along with its key phrases and associated web sites, according to an exemplary embodiment of the invention.

FIG. 1 shows a diagram 100 of a concept 102, its key phrases 104, and its associated web site 106, or other associated data entities. The concept 102 is one or more concept words that are the title of the concept that a user may wish to search for with a search engine. A concept may be a topic, for example. It is typically manually determined. The key phrases 104 for the concept 102 are other phrases of one or more words that a user may enter as a search query to find information regarding the concept 102. The key phrases 104 may be alternative key words for the concept 102, misspellings of the concept 102, shorthand notation for the concept 102, or other phrases for the concept 102. The key phrases 104 are typically manually determined or edited, by examining, for example, query logs of past search queries to determine how users search for the concept 102. The associated web sites 106 are the data entities that are returned to the user when he or she searches for the concept 102. They can be links to web sites related to the concept 102, or other types of data entities. For example, they may be music file links, image file links, or other types of files or links. The associated web sites 106 are typically manually determined or edited as well.

An example of a concept 102 may be the popular singer Britney Spears. The title of the concept 104 are the words Britney Spears. The key phrases 104 for this concept may be just the word Britney, britneyspears.com, the name of her albums, as well as misspellings of her name, such as Brittney, Brittany, and so on. The associated web sites 106 may include the official Britney Spears web site, as well as various fan sites, and sites at which fans can purchase her music. The web sites 106 may also be edited, to ensure that no inappropriate, adult-oriented web sites are included, so that the web sites 106 are children friendly.

Figure 2:
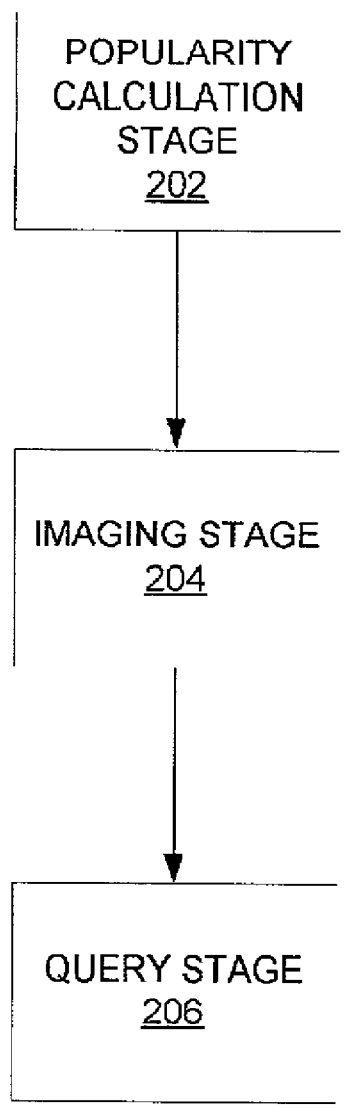
FIG. 2 is a flowchart showing the overall methodology of an exemplary embodiment of the invention.
Figure 2:
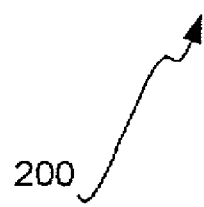

FIG. 2 is a flowchart of a method 200 showing the overall process followed by an exemplary embodiment of the invention. This process is described in summary, with a detailed description provided for each stage in subsequent subsections. In the popularity calculation stage 202, query logs that provide frequency of occurrence of each query on a historical basis, as well as a list of concepts and their associated key phrases, are used to determine the popularity of each key phrase of each concept. This popularity is used in turn to determine the popularity of each concept. The popularity of a concept is based on the queries that match the key phrases associated with the concept, and the occurrence of each of those queries within the query log.

In the imaging stage 204, the output of the refinement stage is indexed, and added to the data image, or database, used by the search engine to answer queries entered by users. Both the refinement stage 202 and the imaging stage 204 occur before a user has entered a query. That is, they are offline stages. They can be performed on a periodic basis to update the popularity of concepts based on newly generated query logs.

The query stage 206 is performed each time a query is entered by a user, and is considered an online stage. A search query is a query phrase that includes one or more words entered by the user. The search engine searches the database for related concepts by textually matching the words of the query phrase against the key phrases of the concepts, as well as the words in the concept titles, resulting in zero or more matching concepts. A concept is said to match a query if the query matches a keyphrase and/or one or more words in the title. Note that the keyphrases and the title words may be matched in different ways to the query. For example, we may use exact string match on the keyphrases, while we may require each of the words in the query to be contained (as a whole word) in the title without regard to order. The use of different matching schemes is not a required part of finding matching concepts. The returned list of matching concepts is sorted by decreasing popularity, such that the most popular choice is listed first. The associated data entities of these concepts may also be shown, or may be displayed when the user selects a concept. A visual measure of the relative popularity of a concept as compared to the other concepts may also be displayed, as well as a preferred search query for each concept.

Refinement Stage

Figure 3:
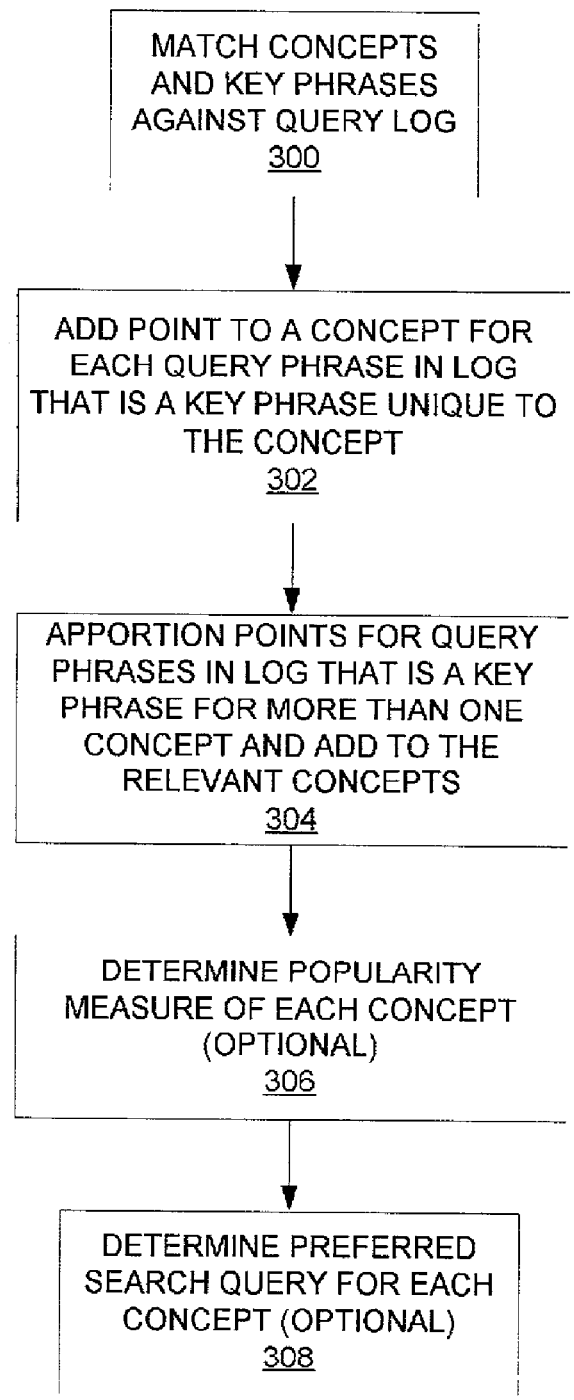
FIG. 3 is a flowchart of a method showing the popularity calculation stage of FIG. 2 in more detail, according to an exemplary embodiment of the invention.
Figure 4:
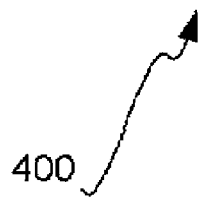
FIG. 4 is a diagram showing the structure of a query log, according to an exemplary embodiment of the invention.

FIG. 3 is a flowchart showing the refinement stage 202 of FIG. 2 in more detail. First, the concept words of the concepts and the key phrases are matched against the query phrases of the query log (300). An example query log is shown FIG. 4. The query log 400 has a number of queries 400a, 400b, and 400m. Each query is a query phrase that includes one or more words. A query may appear more than once in the query log 400. Alternatively, each query in the query log 400 may be a unique query, and have associated therewith the number of times the query was entered during the logging period. For example, in the former case, if the query golf balls was entered 700 times during the logging period, it would appear 700 times in the query log 400. In the latter case, however, the query would appear once, along with the number 700 to indicate that it was entered 700 times during the logging period.

The term query log is used generally. A query log may be a historical log of queries that have been entered by users during a logging period, and this is how it is predominantly used. However, a query log may also be modified to actively affect the popularity of concepts. For example, a query log may be populated with queries that were not actually entered so that the popularity of concepts are predictively modeled. For example, if it is known that the Super Bowl will be a popular search query in the coming months, the query log may be modified to add this query a large number of times to the log. Other ways to affect the ensuing popularity of concepts, for other predictive modeling, or for demographic or for other reasons, are also encompassed within the term query log.

Referring back to FIG. 3, a popularity point is added to a concept for the number of times each query phrase appears in the query log that matches a key phrase unique to the concept (302). That is, a popularity point is added to a concept for the number of times each query phrase matches the concept words of a concept or a key phrase that is unique to the concept. For example, the query Brittany may appear 350 times in the query log. For the concept Britney Spears, there may be a key phrase Brittany that is unique to this concept, such that no other concept has this key phrase. Therefore, 350 popularity points are added to the concept Britney Spears. As another example, the query Britney Spears may appear 200 times in the query log. Because this query matches the concept words of the concept Britney Spears, 200 popularity points are added to the concept.

Next, for query phrases in the query log that match key phrases of more than one concept, a number of popularity points equal to the number of times such a query phrase appears in the query log is divided among such concepts (304). For example, the query tiger may appear 400 times in the query log. There may be two concepts that have the key phrase tiger, the concept Tiger Woods, and the concept wild tiger. Therefore, the 400 popularity points for the query tiger are apportioned between these two concepts. One way to apportion the popularity points is to proportionally divide the points among the concepts based on their amassed popularity points resulting from 302. For example, the concept Tiger Woods may have 900 popularity points so far, and the concept wild tiger may have 100 popularity points so far. Therefore, 90% of the 400 popularity points for the query tiger are added to the concept Tiger Woods, and 10% are added to the concept wild tiger. Other ways to apportion the popularity points can also be used, however, such as equally dividing the points among the concepts that have such matching key phrases.

Figure 5:
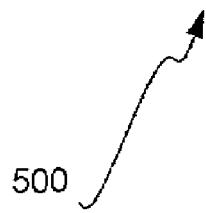
FIG. 5 is a diagram showing the results of matching the query log to the key phrases of a concept, according to an exemplary embodiment of the invention.

The result of 300, 302, and 304 is that each concept has a number of popularity points added thereto, based on the matching of query phrases to the key phrases of the concept. This is shown in the diagram 500 of FIG. 5. The concept 102 has a number of popularity points 502. Each key phrase 104a, 104b, ..., 104n contributes a number of popularity points 502a, 502b, ..., 502n, respectively, to the number of popularity points 502 of the concept itself. Adding the popularity points 502a, 502b, ..., 502n together yields the number of popularity points 502 of the concept 102 itself.

Referring back to FIG. 3, two other parts of the refinement stage 202 may be performed, but are optional. First, a relative popularity measure of each concept may be determined (306). This popularity measure reflects the popularity of each concept as compared to the other concepts, as the concepts appear in the query log by their concept words and key phrases. This popularity may be calculated in many different ways. For example, the popularity measure may be measured on a scale from zero to five, where zero means the concept is least popular, and five means the concept is most popular. In such a case, the popularity measure of a concept can be determined in this implementation as five times the log of the popularity points attributed to the concept divided by the log of the popularity points attributed to the most popular concept.

Second, a preferred search query for each concept may be determined (308). This is the search query that is most likely to result in useful search results for a concept. The preferred search query may be determined for a concept by selecting a key phrase that is unique to the concept, and which has the greatest popularity as compared to any other unique key phrase for the concept and the concept words of the concept. The popularity of a key phrase is indicated by the number of popularity points added to the concept as a result of the key phrase matching a query phrase within the query log. For example, if for the concept Britney Spears the key phrase Britney is unique to the concept and has more popularity points than the concept words Britney Spears and the other unique key phrases do, then the key phrase Britney is selected as the preferred search query. If no unique keyphrase is identified by this method, editorial means may be used to add such a keyphrase.

Imaging Stage

Figure 6:
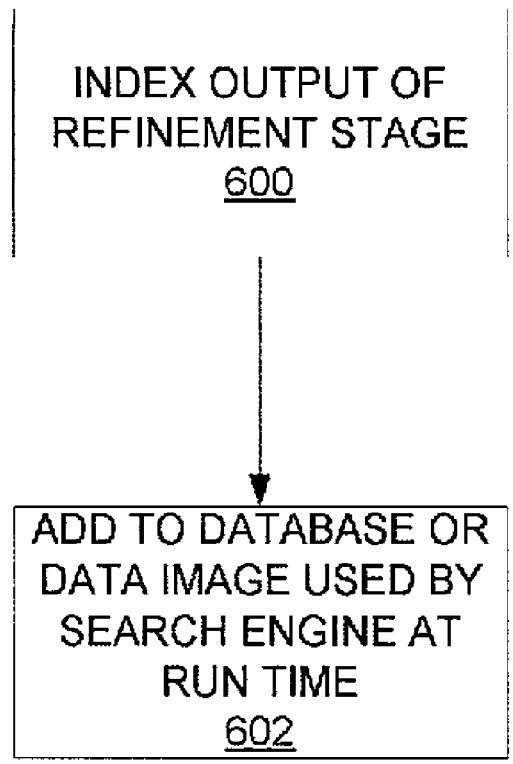
FIG. 6 is a flowchart of a method showing the imaging stage of FIG. 2 in more detail, according to an exemplary embodiment of the invention.

FIG. 6 is a flowchart showing the imaging stage 204 of FIG. 2 in more detail. First, the output of the refinement stage is indexed (600). The output may also then be compressed. The output of the refinement stage is the list of concepts and their determined popularity, as well as their key phrases and associated data entities. This output is indexed and optionally compressed in such a way that it is compatible with the data image or database that is used by the search engine at query time, to run a search query entered by the user. The resulting indexed and optionally compressed output is then added to the database or data image used by the search engine at query time (602). The database or data image may also include other ways to find relevant data entities for search queries. For example, the database or data image may include the data for the techniques used by current search engines as described in the background section.

Query Stage

Figure 7:
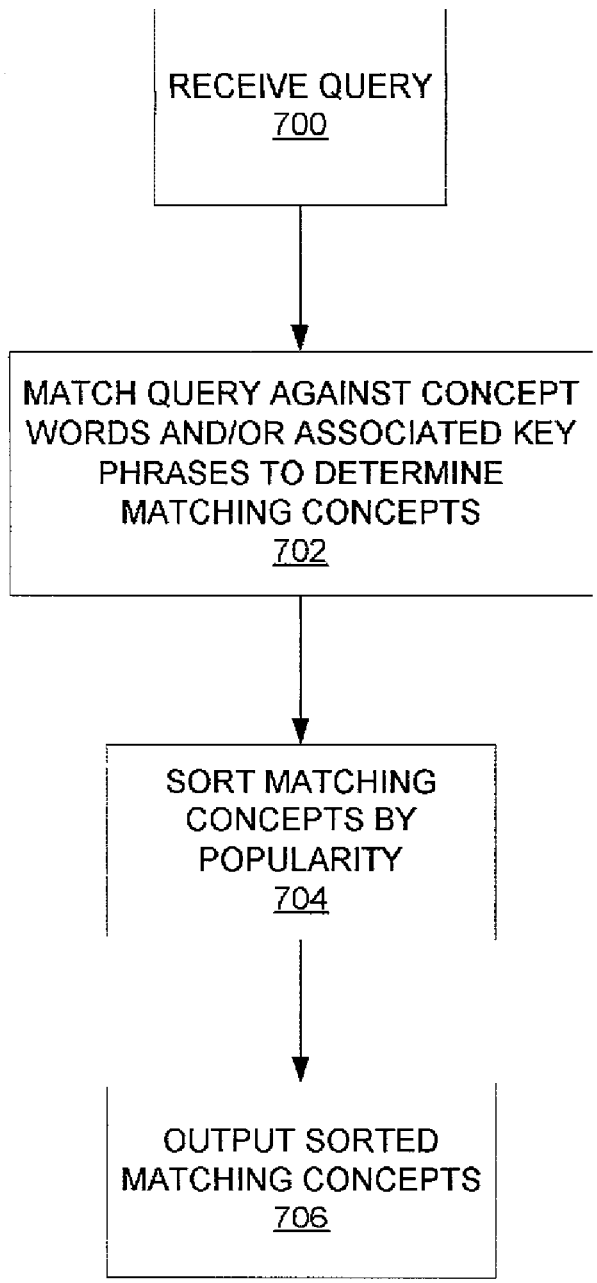
FIG. 7 is a flowchart of a method showing the query stage of FIG. 2 in more detail, according to an exemplary embodiment of the invention.

FIG. 7 is a flowchart showing the query stage 206 of FIG. 2 in more detail. First, a query is received (700). For example, a user may enter a search query, such that the user wishes to receive relevant data entities, such as web page links, for the search query. The received query is next matched against words in the concept title and/or associated key phrases of concepts, to determine concepts that match the query (702). As mentioned earlier, a concept is said to match a query if the query matches a keyphrase and/or one or more words in the titles. Note that the keyphrases and the title words may be matched in different ways to the query an exact string match on the key phrases may be used, while each of the words in the query may be required to be contained (as a whole word) in the title without regard to order. For example, if the search query is the word tiger, the query may match the key phrase tiger for the concept Tiger Woods, as well as the key phrase tiger for the concept wild tiger. The matching concepts are sorted by and in descending order of their popularity (704). Their popularity is measured by the number of popularity points that were added to each concept. The sorted matching concepts are then output (706). If there are a large number of matching concepts, only a predetermined number, such as the first two or three, may be output, or alternatively all the concepts may be output. The output may also include the relative popularity of each of the matching concepts, and/or the preferred search query for each of the matching concepts.

Figure 8:
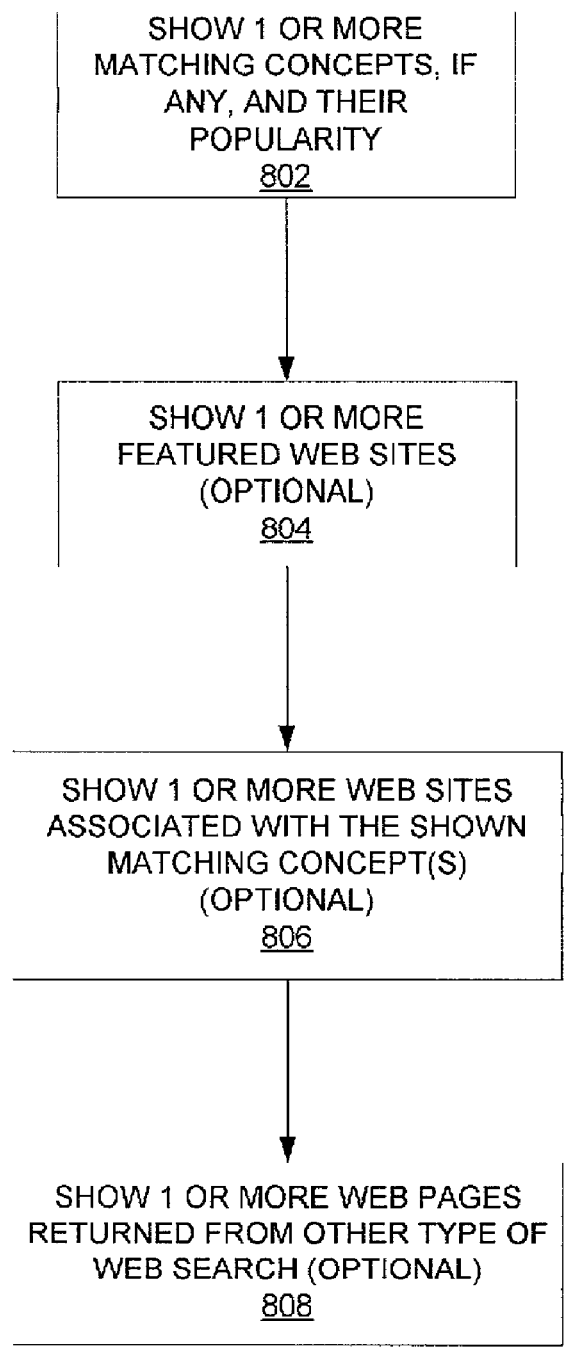
FIG. 8 is a flowchart of a method showing how the results of the query stage of FIG. 7 can be output, according to an exemplary embodiment of the invention.

FIG. 8 is a flowchart of a method 800 showing how the output of the query stage 206 of FIG. 2 can be presented to the user, where the associated data entities of the concepts are web page links. First, the matching concepts and their relative popularity are displayed (802). Where the relative popularity is a number from zero to five, this may be indicated to the user by displaying an equal number of icons, such as shaded stars. One or more featured web sites may optionally next be shown (804).

One or more web sites, that is, web page links, associated with one or more of the matching concepts may also optionally be displayed (806). For example, there may be ten places reserved for showing such web page links. An equal number of associated web page links may be shown from each matching concept, or the places may be divided proportionally among the matching concepts based on their popularity. Finally, one or more web pages returned from other types of search engines may be optionally displayed (808). Such web pages may have been returned by current search engines as have been described in the background section.

Figure 9:
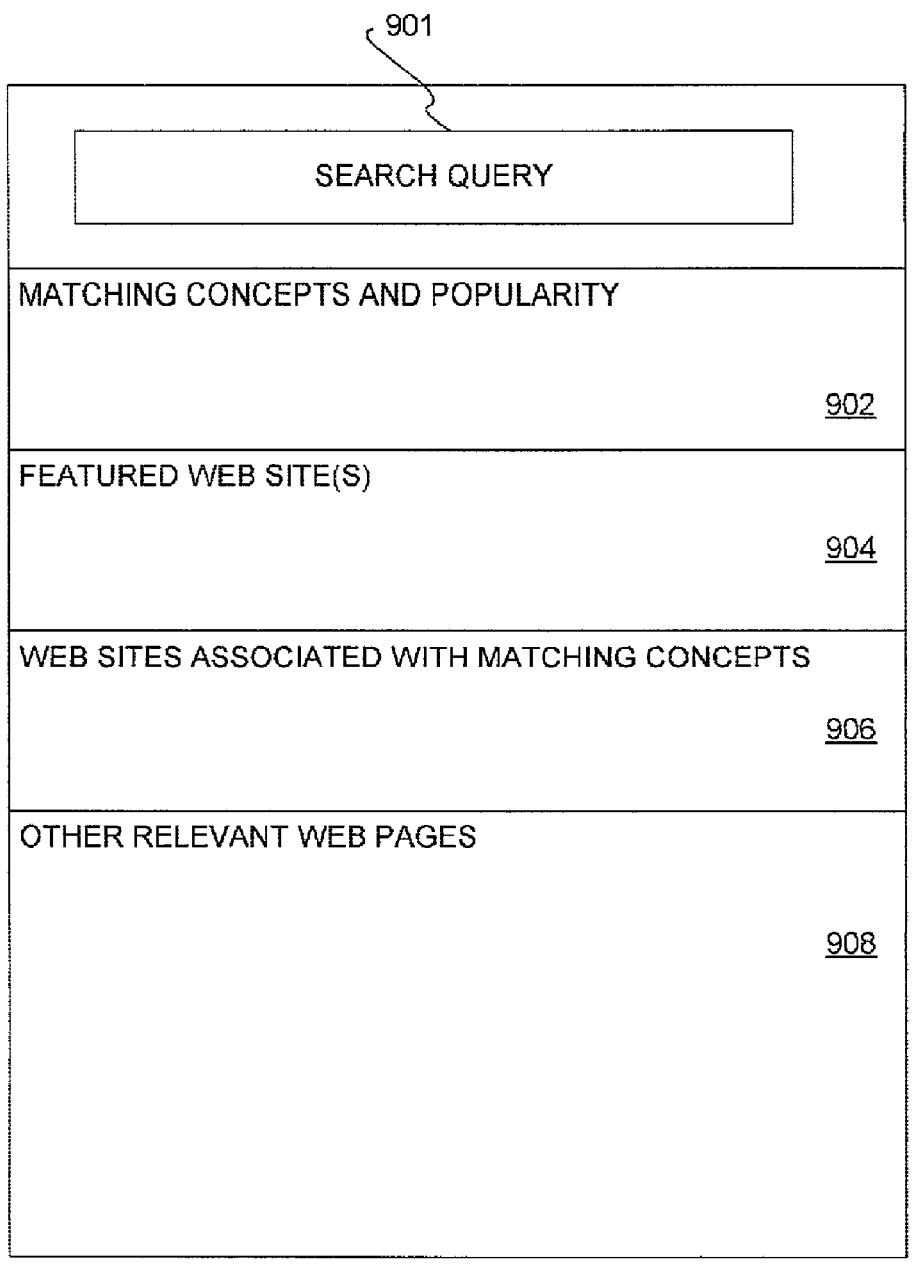
FIG. 9 is a diagram of an exemplary web page depicting the integration of search results obtained in accordance with a preferred embodiment of the invention with other search results.

FIG. 9 is a diagram of a window 900 that shows an example of the output resulting from the method 800 of FIG. 8. The user's search query is shown in the box 901. The matching concepts and their relative popularities that are displayed by performing 802 are shown in section 902 of the window 900. The featured web site or sites that are displayed by performing 804 are shown in section 904. The web sites, that is, web page links, associated with the matching concepts that are displayed by performing 806 are shown in section 906 of the window 900. Finally, any other relevant web pages that are displayed by performing 808 are shown in section 908.

Figure 10:
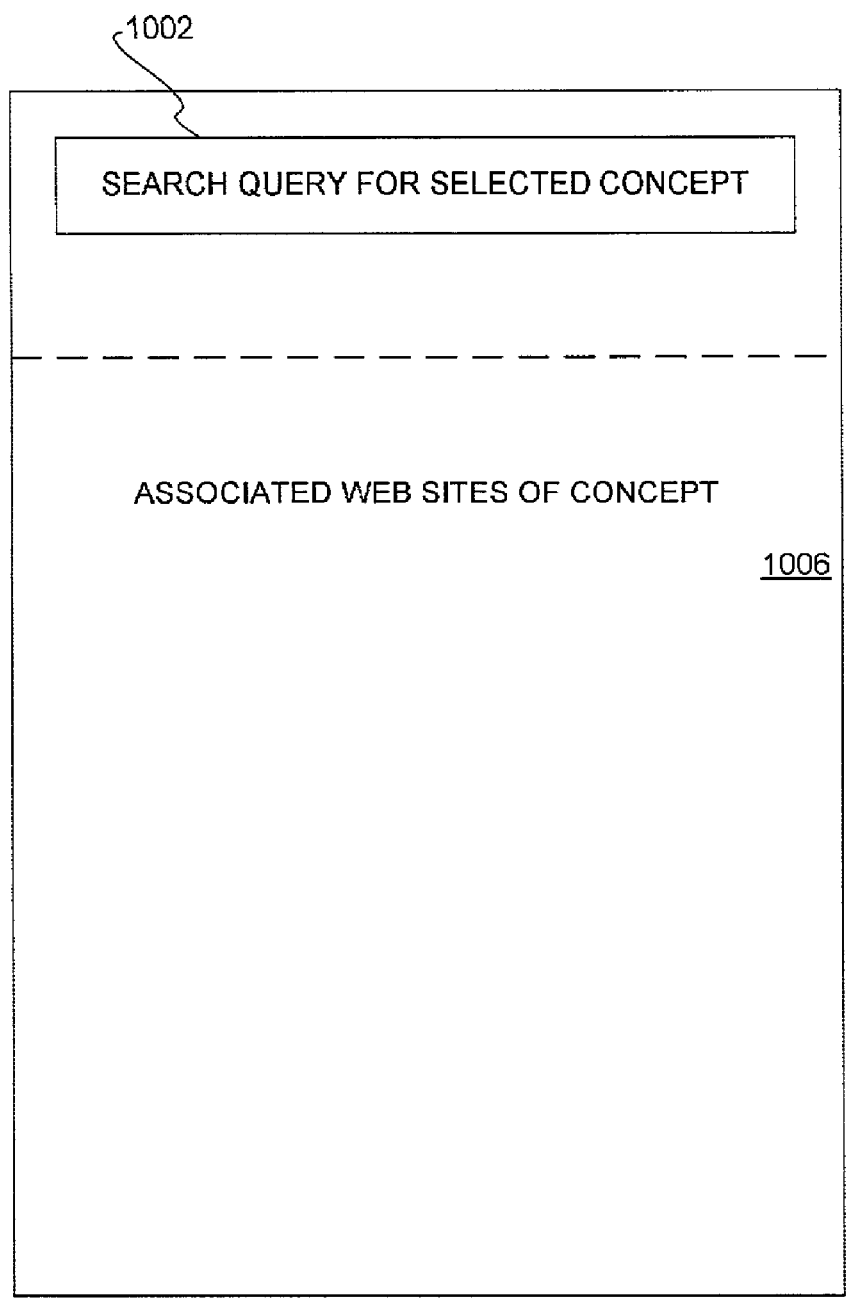
FIG. 10 is a diagram of a web page showing another way as to how the search results of the invention can be output, according to an exemplary embodiment of the invention.

If one of the matching concepts displayed in section 902 is selected by the user, another window may appear, as shown as the window 1000 of FIG. 10. The preferred search query for the selected concept is shown in the box 1002. The associated web sites, or web page links, for the selected matching concept are then displayed in section 1006 of the window 1000. FIGS. 8, 9, and 10 only depict an example of the display of associated data entities of matching concepts that can be used in accordance with the invention. Other manners by which associated data entities of matching concepts can be displayed are also contemplated by the invention.

System and Device Implementation

Figure 11:
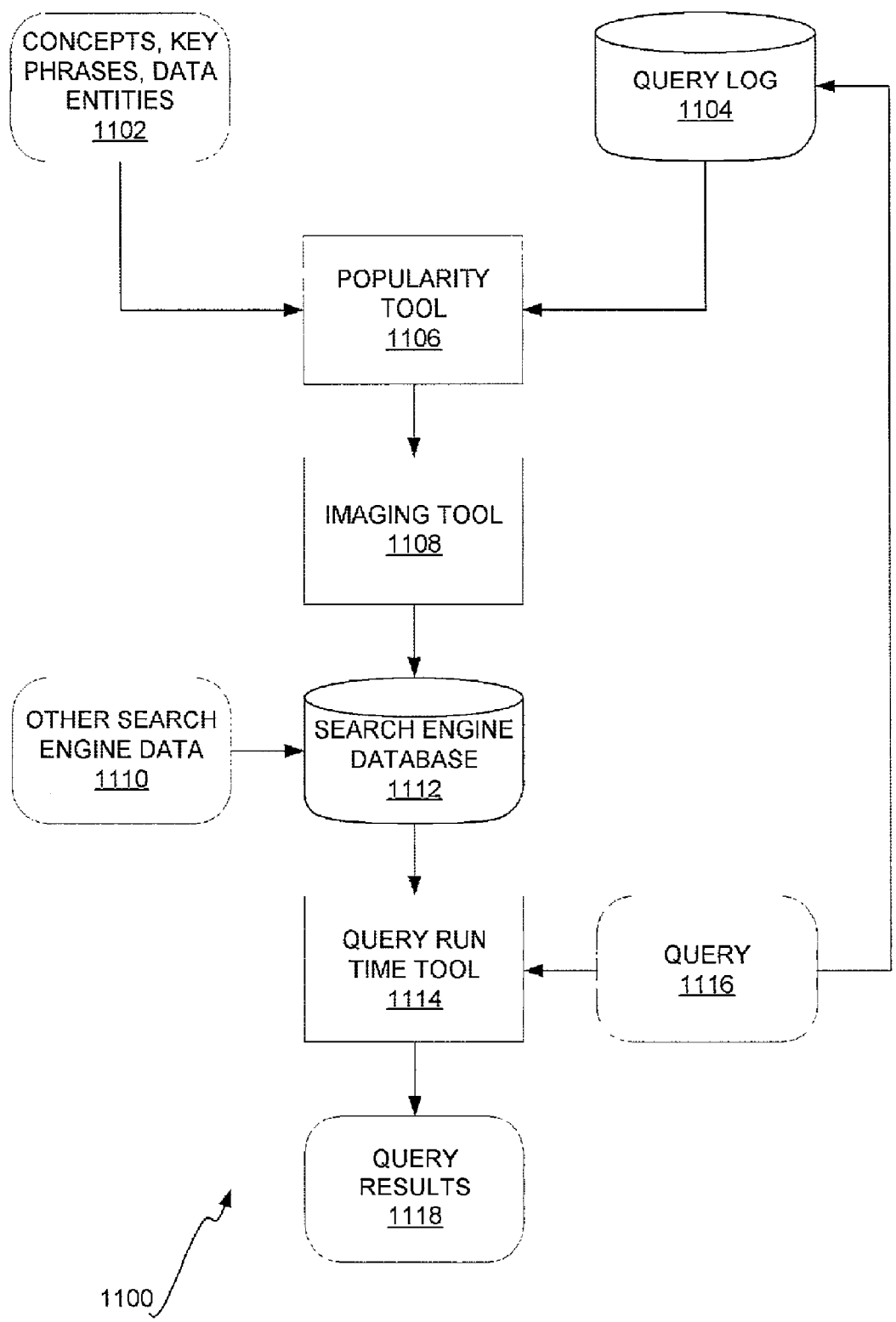
FIG. 11 is a diagram of a system that implements an exemplary embodiment of the invention.

FIG. 11 is a diagram of a system 1100 that can implement the invention as has been described. The concepts, key phrases, and associated data entities 1102, as well as the query log 1104, are used by the popularity tool 1106 to perform the refinement stage 202 of FIG. 2 as has been described. The output of the popularity tool is used by the imaging tool 1108 to perform the imaging stage 204 of FIG. 2 as has been described. The imaging tool 1108 results in a data image or a database that can be integrated into the search engine database 1112, along with other search engine data 1110.

The query run time tool 1114 runs a search against the search engine database 1112 for the search query 1116, as has been described as the query stage 206. The output of the query run time tool 1114 includes query results 1118 based on the query 1116. The query 1116 can also be added to the query log 1104, for future periodic use of the popularity tool 1106, and so on. Each of the tools 106, 1108, and 1114 may be a separate computer or computerized device, a separate computer program, or part of the same computer program.

Figure 12:
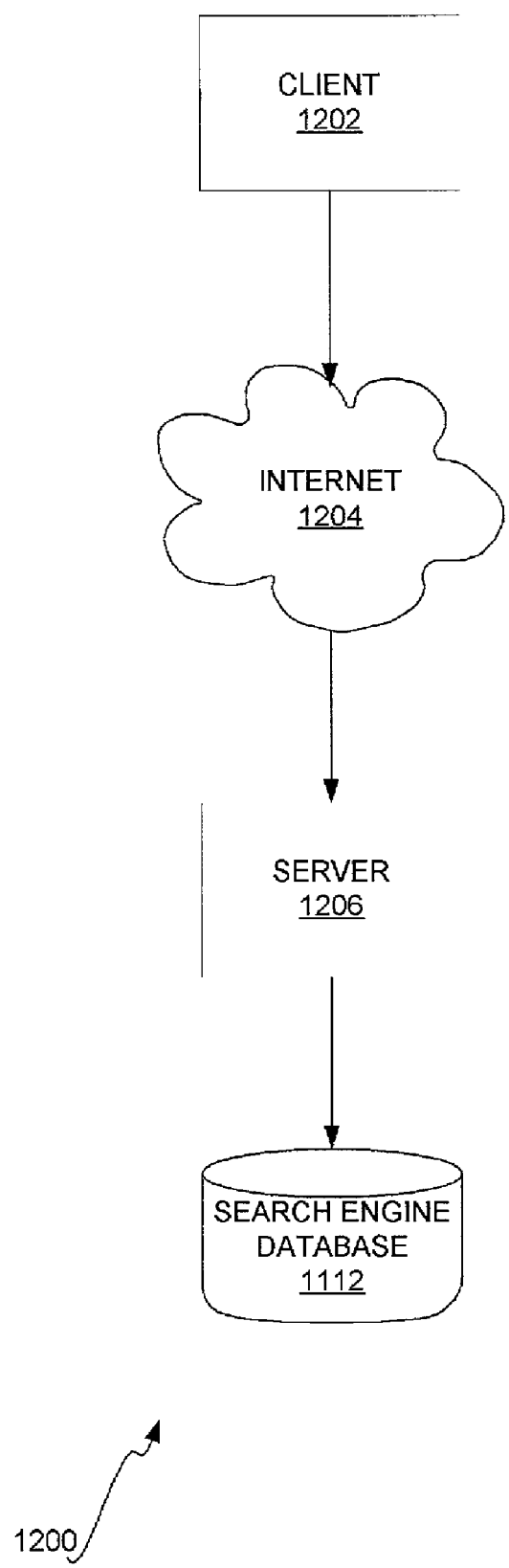
FIG. 12 is a diagram of another system that implements an exemplary embodiment of the invention, as compared to FIG. 11.

FIG. 12 is a diagram of an environment 1200 in which the invention can be used. A client 1202 and a server 1206 are both communicatively connected to the Internet 1204. The server 1206 has access to the search engine database 1112. A user enters a search query on the client 1202, which is sent to the server 1206 over the Internet 1204. The server 1206 performs the query stage 202 of FIG. 2 as has been described, matching the search query received from the client 1202 against the database 1112. The results are then returned back to the client 1202 over the Internet 1204, where they can be displayed for the benefit of the user.

FIG. 13 illustrates an example of a suitable computing system environment 10 on which the invention may be implemented. For example, the environment 10 may implement the client 1202, the server 1206, and/or the system 1100 that have been described. The computing system environment 10 is only one example of a suitable computing environment and is not intended to suggest any limitation as to the scope of use or functionality of the invention. Neither should the computing environment 10 be interpreted as having any dependency or requirement relating to any one or combination of components illustrated in the exemplary operating environment 10. In particular, the environment 10 is an example of a computerized device that can implement the servers, clients, or other nodes that have been described.

The invention is operational with numerous other general purpose or special purpose computing system environments or configurations. Examples of well known computing systems, environments, and/or configurations that may be suitable for use with the invention include, but are not limited to, personal computers, server computers, hand or laptop devices, multiprocessor systems, microprocessorsystems. Additional examples include set top boxes, programmable consumer electronics, network PCs, minicomputers, cell phones, mainframe computers, distributed computing environments that include any of the above systems or devices, and the like.

The invention may be described in the general context of computerinstructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An example of a system for implementing the invention includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated by dashed line 16. Additionally, device 10 may also have additional features/functionality. For example, device 10 may also include additional storage (removable and/or non-removable) including, but not limited to, magnetic or optical disks or tape. Such additional storage is illustrated in by removable storage 18 and non-removable storage 20.

Computer storage media includes volatile, nonvolatile, removable, and non-removable media implemented in any method or technology for storage of information such as computer readable instructions, data structures, program modules, or other data. Memory 14, removable storage 18, and non-removable storage 20 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Communications connection(s) 22 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 10 may also have input device(s) 24 such as a keyboard, mouse, pen, voice input device, touch input device, etc. Output device(s) 26 such as a display, speakers, printer, etc. may also be included. All these devices are well known in the art and need not be discussed at length here.

The methods that have been described can be computer-implemented on the device 10. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

The invention claimed is:

1. A method implemented at least in part by a computer for refining a user query, the method comprising:
   grouping a plurality of terms into a search concept, the search concept being a category that represents a clustering of the terms;
   examining a query log to determine to a number of times that each of the terms appears within queries stored in the query log;
   calculating a relative popularity for the search concept by adding the number of times that each of the terms appears within the queries stored in the query log, whereby the relative popularity is calculated relative to at least one other search concept in a list of search concepts;
   receiving a query from a user; and
   mapping the user query to the search concept.

2. The method of claim 1, further comprising initiating, upon the user's request, a preferred query associated with the search concept to provide improved search results.

3. The method of claim 1, wherein the method is performed by execution of instructions stored on a computer-readable medium.

4. The method of claim 1, comprising mapping the user query to the at least one other search concepts in the list of search concepts.

5. The method of claim 2, wherein initiating the preferred search query comprises selecting one of the terms associated with the concept that has appeared a greatest number of times within queries stored in the query log.

6. The method of claim 4, further comprising automatically initiating a preferred query associated with at least one of the listed search concepts to provide a set of improved search results.

7. The method of claim 3, wherein the set of improved search results comprises one or more sub-sets of the set of improved search results, each sub-set associated with one of the listed search concepts and having a number of search results proportional to the relative popularity of the listed search concept.

8. The method of claim 3, wherein automatically initiating the preferred search query comprises selecting, for each of the listed search concepts associated with the preferred query, one of the terms associated with the listed search concept that has appeared a greatest number of times within queries stored in the query log.

9. The method of claim 4, further comprising displaying the list of search concepts.

10. The method of claim 9, wherein the listed search concepts are popular search concepts and wherein their relative popularity can be used to order the displayed list.

11. A system comprising:
   a search concept that is a category which represents a clustering of a plurality of terms; and
   a server communicatively coupled with a client at which a user generates a query, wherein the server groups the terms into the search concept, examines a query log to determine a number of times that each of the terms appears within queries stored in the query log, calculates a relative popularity for the search concept by adding the number of times that each of the terms appears within queries stored in the query log, and maps the user query to the search concept, whereby the relative popularity is calculated relative to at least one other search concept in a list of search concepts.

12. The system of claim 11, wherein the server is a search engine and the client is a web browser.

13. The system of claim 11, wherein the server and the client are applications.

* * * * *